ZZZ# 2,824,846
POLYMERS OF STYRENE, PROCESS FOR POLYMERIZATION, AND COMPOSITIONS CONTAINING SAME

Ival O. Salyer, James A. Herbig, and Joachim Dazzi, Dayton, Ohio, assignors to Monsanto Chemical Company, St. Louis, Mo., a corporation of Delaware No Drawing. Application March 17, 1954
Serial No. 416,958

16 Claims. (Cl. 260—23)

This invention relates to improved polystyrene-type resins. In some of its aspects the invention pertains to styrene polymers having broadened transition range. In other aspects this invention pertains to styrene polymers having good tensile elongation, flexural deflection, and/or impact strength.

Polystyrene is one of the most important plastics of commerce. Its many valuable properties are well known. However, certain of its physical properties could advantageously be improved. Thus, the transition range of polystyrene is very narrow. The transition range covers all temperatures above that at which the polymer is brittle and below that at which it becomes soft and rubbery. One accepted measure of the transition range is that obtained by the Clash-Berg method, Industrial and Engineering Chemistry, 34, 1218 (1942), ASTM D–1043–51, which is a measure of the stiffness of the plastic specimen as a function of temperature, measured by means of a torsional test. The brittle temperature ($T_f$) is the temperature at which the stiffness modulus is 135,000 pounds per square inch. The rubber temperature ($T_{2000}$) is the temperature at which the stiffness modulus is 2000 p. s. i. The transition range is designated "Stifflex range," or "SR," in degrees C., and is calculated by subtracting the value of $T_f$ in °C. from the value of $T_{2000}$ in °C. A narrow "Stifflex range" markedly limits the use of a plastic in some applications, since the range of temperature between the brittle condition and rubbery condition is too narrow. One application in which the valve of styrene polymer is limited by its narrow transition range, is in latex paints. In such paints, a broad transition range is valuable in assuring the production of a continuous, flexible film from polymer latex.

Polystyrene cannot be used for many potential applications where particular toughness is required. Toughness is manifested by high tensile elongation, high flexural deflection and/or high impact strength. Improvement of any of these properties is desirable.

It is known to incorporate various materials of low or high molecular weight in polystyrene for the purpose of improving the toughness and other properties. Ordinarily, use of liquid plasticizers radically lowers the softening point (of which the Clash-Berg $T_f$ can be taken as a measure), which may or may not be objectionable for a particular use, but the transition range is not appreciably affected. Addition of high molecular weight materials such as polymers, or for that matter any material, usually gives rise to problems of compatibility. If the added material is too incompatible with the polystyrene, the clarity and/or color of the product are adversely affected and the physical properties of the resulting blend may make it unfit for practical use.

In accordance with the present invention in preferred embodiments, polystyrene-type resins are made by polymerizing styrene monomer containing a small quantity of an adduct of a dialkyl fumarate and an unsaturated fatty oil, e. g., a dibutyl fumarate-soy bean oil adduct. The resulting polymeric material, which is a styrene polymer having modified properties, has excellent clarity and color thus evidencing great compatibility between the adduct and polymeric styrene. Further, a marked broadening of the transition range of polystyrene can be obtained in this manner. The tensile elongation of polystyrene is improved by polymerizing styrene monomer in the presence of adducts of the type described herein, as are often the flexural deflection and/or impact strength. By emulsion polymerization of styrene monomer containing adducts of the designated type, a styrene polymer latex can be obtained which will air dry at room temperature to give a continuous flexible film. Further, a polymeric third component, e. g., polyvinyl chloride, polyacrylate resins, natural and synthetic rubbers, or the like, can be incorporated into the styrene monomer containing the adduct and the adduct appears to act as a compatibilizer for the added third component in the final styrene resin. Advantage can be taken of this compatibilizing effect of the adduct by blending in any manner such a polymeric third component with a preformed polystyrene product containing adduct that was present during the polymerization, as for example making such product in the form of a latex and blending such latex with another latex containing the third component, e. g., a polyvinyl chloride latex.

Preferred adducts to employ in the present invention are prepared by reacting a dialkyl fumarate (an alkoxyalkyl group can be substituted for one or both of the alkyl groups in the dialkyl fumarate) containing from six to twenty carbon atoms in the molecule, with an unsaturated, non-hydroxylated, preferably not highly conjugated, fatty oil having from ten to twenty-four carbon atoms in each acid portion of the molecule, i. e., in each residue of the unsaturated non-hydroxylated non-conjugated fatty acid three molecules of which fatty acid esterify glycerine in making up the triglyceride fatty oil. Such adducts may be characterized as polycarboxylates in which from 3 to 12 moles of a dialkyl fumarate of from 6 to 20 carbon atoms are combined at the acid portions of one mole of said fatty oil. The addition products that we have found to be particularly valuable in the practice of the present invention can be represented by the formula:

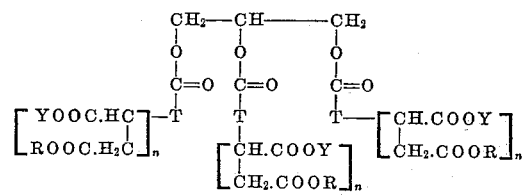

in which Y and R are alkyl and/or alkoxyalkyl radicals of from one to eight or more carbon atoms, T is a non-conjugated, aliphatic olefinic hydrocarbon radical of from 9 to 23 carbon atoms, and $n$ is an integer of from one to four.

Esters of fumaric acid which may be reacted with the non-conjugated, non-hydroxylated fatty oils to yield the presently useful adducts are simple or mixed dialkyl (or dialkoxyalkyl or alkyl alkoxyalkyl) fumarates in which each alkyl or alkoxyalkyl radical preferably has from 1 to 8 carbon atoms, e. g., methyl, ethyl propyl isopropyl, or n-butyl fumarate, ethyl methyl fumarate, isobutyl propyl fumarate, di(2-methylhexoxyethyl) fumarate, t-butyl ethoxyethyl fumarate, etc. As examples of useful fatty oils of the present invention may be mentioned soy bean oil, safflower oil, olive oil, linseed oil, corn oil, peanut oil, perilla oil, salmon oil, menhaden oil, cotton seed oil, etc.

While isomeric mixtures are possible, and the position to which the fumarate residue is attached to the fatty acid portion of the triglyceride oils is not known, the reaction of, e. g., three moles of a dialkyl fumarate with one mole of an unsaturated, non-conjugated fatty oil such as olive oil may be illustrated by noting the probable reaction scheme with oleic acid triglyceride, the major component of olive oil:

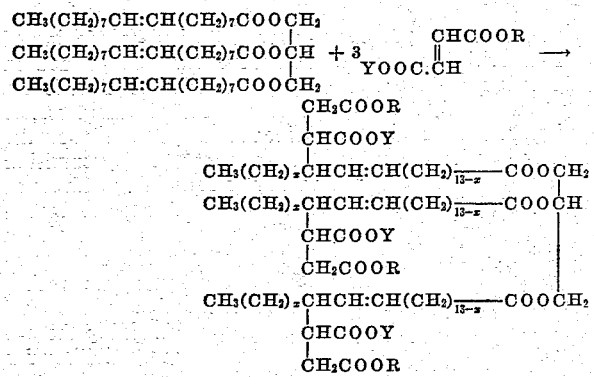

in which Y and R are as defined above, and $x$ is a whole number between 5 and 8.

Depending upon the reactant quantities and reaction conditions, from 1 to 4 fumarate residues can be added to each of the alkenyl portions of the triglyceride. Hence, as many as 27 carboxylate radicals may be present in the usual adducts.

The adducts are very easily made merely by heating together suitable quantities of the non-conjugated non-hydroxylated fatty oil and the fumarate ester. An excess of the fumarate ester over that desired to be incorporated in the adduct is used, and this excess conveniently serves as a solvent during the reaction. A reaction temperature within the range of 150–300° C. is usually satisfactory, and the reaction time may vary from say 1 to 12 hours, depending upon the temperature, the particular oil, the particular fumarate ester, and the proportions of the materials. The reaction is usually effected at atmospheric pressure at reflux conditions. It is preferred to have present a small quantity of a polymerization inhibitor, e. g., hydroquinone or suitable polyhydroxy benzenes. The course of the reaction can very easily be followed by determination of the refractive index of the reaction mixture, as the refractive index increases as an increase in the quantity of fumarate ester has entered into reaction with the oil. After the reaction has been effected to the desired extent, any excess fumarate ester is easily stripped off by conventional means, leaving a desired adduct ready for use.

Those skilled in the art will appreciate that fumarate ester-unsaturated fatty oil adducts prepared from any of the various dialkyl fumarates and any of the various unsaturated fatty oils and in accordance with any of the procedures described herein, cannot be considered to be the full equivalents of each other for all purposes in the practice of the present invention wherein such adducts are dissolved in styrene monomer and the styrene monomer is polymerized, and that the results obtainable will be affected to an appreciable extent by the particular dialkyl fumarate, the particular unsaturated fatty oil, the proportions of fumarate to oil chosen, and the particular method employed to make the adduct. In its broadest aspects the invention contemplates the use of any dialkyl (the term alkyl being understood to be inclusive of alkoxyalkyl) fumarate-unsaturated fatty oil adduct of the nature described herein. However, it is preferred that adducts be used having, in the adduct molecule, a mole ratio of the chosen fumarate to the oil within the range of from 5:1 to 10:1.

Only small quantities of the adduct need be used. Ordinarily, not more than 5 percent of the adduct, based upon the combined weight of monomeric material (consisting of or comprising styrene) plus said adduct, is used. However, higher quantities, especially from 5 to 10 weight percent of adduct, can be used to distinct advantage. In some particular instances even larger quantities of the adduct can be used, so that in its broadest aspects the invention contemplates the use of quantities up to 30 percent, ranging on down to 2 percent and as low as 1 percent or even less, so long as some of the advantages of the invention are obtained. The quantity of adduct to be used for optimum results will, of course, be dependent to a considerable extent on the general characteristics of the adduct, as well as on the conditions employed in effecting the polymerization of styrene containing same, and the use to which the final styrene polymer product is to be put. In any event, sufficient adduct is used to improve at least one of the following characteristics: transition range, tensile elongation, flexural deflection, impact strength. Preferably, sufficient of the chosen adduct is used to broaden the transition range, and increase the tensile elongation, of the final polymer products over the values for these properties that would be obtained by polymerizing styrene under identical conditions in the absence of said adduct. Those skilled in the art, having had the benefit of the present disclosure, will be able to determine suitable combinations of particular dialkyl fumarate, unsaturated fatty oil, ratios of one to the other, conditions for making the adduct, styrene polymerization conditions, properties with respect to the finished polymer product, to obtain a final desired polymer product.

The polymerization of styrene monomer containing a fumarate adduct of the type described herein, is easily effected without the use of any catalyst, and this procedure, especially in the case of mass polymerization, is normally preferred. However, if desired, conventional styrene polymerization catalysts can be employed. The polymerization can be effected at atmospheric or superatmospheric pressures, or even sub-atmospheric pressures though this is not ordinarily advantageous. Suitable catalysts are the free radical promoting type, principal among which are peroxide-type polymerization catalysts and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR", wherein R' is an organic radical and R" is an organic radical or hydrogen. These compounds are broadly termed peroxides, and in a more specific sense are hydroperoxides when R" is hydrogen. R' and R" can be hydrocarbon radicals or organic radicals substituted with a great variety of substituents. By way of example, suitable peroxide-type catalysts include: benzoyl peroxide, tertiary butyl peroxide, tertiary butyl hydroperoxide, diacetyl peroxide, diethylperoxycarbonate, dimethylphenyl hydroperoxymethane (also known as cumene hydroperoxide), among the organic peroxides; hydrogen peroxide, potassium persulfate, perborates and other "per" compounds among the inorganic peroxides. The azo-type polymerization catalysts are also well known to those skilled in the art. These are characterized by the presence in the molecule of the group —N=N— wherein the indicated valences can be attached to a wide variety of organic radicals, at least one, however, preferably being attached to a tertiary carbon atom. By way of example of suitable azo-type catalysts can be mentioned α,α'-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type or other free-radical promoting type of polymerization catalyst is used in small but catalytic amounts, which are generally not in excess of 1 percent by weight based upon the monomeric material. A suitable quantity is often in the range of 0.01 to 0.5 percent by weight.

For the most satisfactory results, the polymerization of styrene containing fumarate adducts of the type described herein should be effected under such conditions as will result in a final product having a molecular weight of at least 100,000 on the modified Staudinger scale.[1] Polymers having molecular weights appreciably above 500,000 tend to be difficult to process. Most satisfactory products have molecular weights within the range of 150,000 to 300,000. It is also important that the reaction conditions be such as will result in a high degree of conversion of the styrene to high molecular weight polymer, measured by an alcohol (methanol) solubles content of less than 5 weight percent for the total product. Those skilled in the art, having had the benefit of the present disclosure, will be able to choose a combination of reactants and reaction conditions resulting in a product having the characteristics desired.

Polymerization of styrene, containing fumarate adducts, can be effected in accordance with the present invention by mass polymerization, i. e., the reaction mixture consists of the monomer (or monomers), adduct, and catalyst, if any is employed, plus any other added material which it is desired to incorporate during the polymerization, and no added solvent or other reaction medium is present. Polymerization can also be carried out by the suspension or emulsion techniques. Where a polymer product useful in water base paints is to be prepared, emulsion technique is used. For suspension polymerization a reaction medium such as water is used together with a small amount of a suspending agent, for example tricalcium phosphate, a vinyl acetate-maleic anhydride copolymer product, etc., to give a suspension of particles of initial reaction mixture which are not of sufficiently small size as to result in a permanently stable latex as a final product. To effect emulsion polymerization, sufficient amount of emulsifying agent, for example a water soluble salt of a sulfonated long chain alkyl aromatic compound, is employed in suitable quantity along with vigorous agitation whereby an emulsion of the reactants in water is formed and the product is obtained in the form of a latex. The latex can then be coagulated if desired, by known methods, and the polymer separated from the water. In effecting emulsion or suspension polymerization, the adduct should first be intimately dispersed in the styrene monomer, and the resulting mixture then subjected to the polymerization procedure. Conventional persulfate or redox catalysts systems can be used in carrying out emulsion or suspension polymerization. Similarly, in effecting mass polymerization, it is desirable to effect an intimate dispersion of adduct in styrene monomer before starting the polymerization. Conventional recipes and procedures for effecting mass, suspension, and emulsion polymerization of styrene are so well known to those skilled in the art that they need not be reiterated here. Polymerization can be effected by any of the conventional procedures with suitable modifications where necessary because of the presence of the adduct in the monomeric styrene. Use of an added organic solvent during the polymerization is apt to result in too low a molecular weight product, and therefore if such a solvent is desired other conditions should be used such as to result in a high molecular weight product; for example, the use of a very high pressure tends to increase the molecular weight of the styrene polymer product under these circumstances.

It is believed highly probable that in the practice of this invention a certain amount of interpolymerization occurs between styrene and the fumarate-unsaturated fatty oil adduct incorporated in the styrene monomer, with the resultant formation of what can be called graft polymer, although it is not certain that all molecules of the adduct become united with one or more styrene monomer units. However, the invention is not to be limited by any particular theory advanced. It is also interesting to note that the products of the present invention are much different from and superior to the products prepared in the same manner but using only the unsaturated fatty oil which has not been adducted with the dialkyl fumarate.

While the invention is directed particularly to homopolymers of styrene (disregarding any interpolymerization that may occur between styrene and the adduct), it is permissible and not outside the broad scope of the invention to have other polymerizable unsaturated comonomers present during the polymerization, in amounts preferably not to exceed 15 weight percent and often less than 10 weight percent of total styrene plus comonomer, provided such comonomer, for example α-methylstyrene, vinyl toluene, acrylonitrile, ethyl acrylate, butyl acrylate, methyl methacrylate, and the like, is not of such nature or of such quantity as to affect adversely the desired characteristics of the resulting polystyrene-type product.

The polystyrene-type resins prepared as described herein can also have included therein additional materials such as plasticizers, stabilizers, fillers, dyes, pigments, other polymers and the like. Such materials can be added after preparation of the polymeric product, as by milling together or otherwise admixing the added materials with the polystyrene-type product, or can be present during the polymerization provided such presence does not adversely affect the polymerization process or the product to an undesirable extent. Of particular importance is the use of products of the present invention in latex paints, in which event it is usually desirable to add plasticizers to lower the softening temperature of the styrene polymer product even farther and thus give more flexible films. Suitable plasticizers for latex base paints are now well known in the art, and particular reference can be made, for example to dibutyl phthalate, tricresyl phosphate, polychlorinated polyphenyls, and the like. An important advantage of our products made in the form of latex is that, with 20 percent adduct present in the monomeric styrene, the latex obtained on polymerization will air-dry to a non-tacky flexible film. In contrast, from 40 to 60 percent of conventional plasticizers must be used with polystyrene latex to form a flexible film. By use of our product some of the chronic deficiencies of normally plasticized polystyrene latices are minimized. Our product, because of its broader transition range, produces films which are less brittle and less tacky than many conventional formulations. Normal plasticized polystyrene undergoes a very rapid transition from a rigid brittle material to a soft tacky substance with increasing plasticizer concentration. "Plasticization" via our polymerization blend broadens this range to such a degree that practical utility within this range can be obtained and the benefits of properties available in this "plasticized" state, thusly obtained. This is even more important in molded products, monofilaments, and packaging films in which these deficiencies are more pronounced due to the very nature of the application.

The products of the present invention, especially those containing not over 10 weight percent adduct, can be subjected to injection or compression molding and other operations which are standard for polystyreen. The resulting molded products have excellent clarity and color. Further their toughness is improved, especially the tensile elongation and, often to a lesser extent, their flexural deflection and/or their impact strength. The products have a broader transition range than polystyrene or than styrene polymers containing modifying materials other than the adducts disclosed herein.

The following examples provide details of certain preferred embodiments of the invention. The data are to be taken as exemplary, and the invention in its broadest aspects is not limited to the particular conditions, proportions and materials set forth therein.

EXAMPLES

A soybean oil-diethyl fumarate adduct was made in the following manner. One hundred thirty-five (135) parts by weight of soybean oil and 311 parts by weight of diethyl fumarate were placed in a stirred vessel equipped with reflux condenser. These quantities rep-

---

[1] Molecular weight calculated by modified Staudinger equation using the formula $[\eta]=KM^a$ wherein $K=7.54\times10^{-5}$, $a=0.783$ and M is the molecular weight.

resented a mole ratio of fumarate to oil of 12:1. The mixture was heated to an initial temperature of 204° C. at which point active boiling and refluxing of the reaction mixture started. Heating was continued for a period of 10 hours from the initial refluxing time. At the end of 10 hours the temperature of the reaction mixture had reached 233° C. After this 10-hour reaction period, unreacted diethyl fumarate was removed from the adduct by heating at 200° C. and 1 mm. Hg pressure for a period of about one hour. Based on weight of remaining adduct, and also on amount of unreacted diethyl fumarate removed, the mole ratio of diethyl fumarate combined with oil in the adduct was 10.6:1. The adduct was a liquid material having a refractive index $n_D^{25}$ 1.4732.

In a manner similar to that described, an adduct of di(n-butyl) fumarate with soybean oil was prepared. Initial reaction mixture was composed of 90 parts by weight soybean oil and 160 parts by weight dibutyl fumarate, representing a mole ratio of fumarate to soybean oil of 7:1. The reaction mixture was heated to 260° C. and maintained at that temperature for a period of 3 hours. Thereafter, unreacted butyl fumarate was removed by heating under vacuum as described in the preceding paragraph. The remaining adduct contained dibutyl fumarate combined with soybean oil in a mole ratio of 6.15:1. The refractive index of the liquid was 1.4714.

Varying quantities of the two adducts whose preparation has been described, were dissolved in styrene monomer, and the resulting material subjected to polymerization for 45 hours at 120° C., followed by 4 hours at 180° C. As a check, varying quantities of untreated soybean oil were also dissolved in styrene monomer and subjected to a similar polymerization cycle leading to a comparable molecular weight product. Additionally, mechanical blends of varying quantities of soybean oil and of the soybean oil diethyl fumarate adduct with preformed polystyrene were prepared by thoroughly milling the liquid soybean oil or soybean oil-diethyl fumarate adduct into polystyrene on hot mill rolls. The term "mechanical blend" is used to describe this type of blend. The term "polymerization blend" is used to describe products obtained by polymerizing styrene monomer in the presence of the added material.

The various blends were subjected to standard plastics testing procedures, and the results are presented in Table I. Table I also contains, for comparison purposes data on typical properties of commercial polystyrene prepared by mass polymerization.

Examination of the data in Table I shows that incorporation of soybean oil in either mechanical or polymerization blends give no significant improvement in any properties of polystyrene. Although 20 percent soybean oil mechanically blended in the polystyrene gave a marked widening in Stifflex range, and a definite tensile yield point, the lack of any improvement whatsoever in the other properties, and the very severe loss in both tensile and flexural strength, make this product unsuitable for any ordinary use. The incorporation of 20 percent soybean oil in styrene monomer prevented the polymerization. The soybean oil-diethyl fumarate adduct gave several improvements when used in a polymerization blend. Some widening of the Stifflex range is noted. The tensile elongation is markedly improved, the greatest improvement being at the 10% level. The loss in tensile and flexural strength as the amount of added material increases is not nearly so great as in the case of soybean oil. The impact strength is slightly higher than in the case of mechanical blends made with the same respective quantities of soybean oil-diethyl fumarate adduct. The soybean oil-dibutyl fumarate adduct gave even better results. The Stifflex range has been very markedly increased. A definite tensile yield point is given with 10 percent adduct as well as with 20 percent adduct. The tensile elongation is markedly improved. The impact strength is somewhat improved. With the dibutyl fumarate adduct, as well as the diethyl fumarate adduct, flexural deflection is maintained or improved with increasing quantity of adduct, as compared with loss in flexural deflection value with increasing quantities of soybean oil alone in a polymerization blend. Another important aspect, not shown in Table I, lies in the appearance of the polymer products. The polymerization blends made from the diethyl fumarate and dibutyl fumarate adducts had excellent clarity and color, even at the 20 percent concentration where the soybean oil blend was white, opaque and incompatible.

While the invention has been described herein with particular reference to various preferred embodiments thereof, it will be appreciated that variations from the details given herein can be effected without departing from the invention in its broadest aspects.

We claim:

1. Styrene polymer prepared by polymerizing styrene containing a small quantity of an adduct of an unsaturated non-hydroxylated fatty oil and a fumarate selected

*Table I*

| Addend | Percent In Blend | Type of Blend | Clash-Berg | | | Specific Viscosity | Tensile Properties | | | | Flexural Properties | | Notched Impact Strength (ft. lbs.) |
| | | | $T_1$ | $T_{2000}$ | SR | | Yield | | Break | | | | |
| | | | | | | | p. s. i. | Percent Elong. | p. s. i. | Percent Elong. | p. s. i. | Defl. (in.) | |
| None (Commercial polystyrene) | 0 | (²) | 90 | 102 | 12 | | | | 8,000 | 2.5 | 16,000 | 0.2 | 0.5 |
| SO | 2.5 | Mech | 74.9 | 92.6 | 17.7 | 0.094 | | | 7,738 | 4.4 | 14,511 | 0.15 | 0.76 |
| | 5.0 | | 74.0 | 88.9 | 14.9 | 0.092 | | | 8,182 | 5.0 | 14,758 | 0.17 | 0.71 |
| | 10.0 | | 58.5 | 79.0 | 15.5 | 0.085 | | | 6,411 | 4.1 | 11,844 | 0.22 | 0.44 |
| | 20.0 | | 40.1 | 76.4 | 36.3 | 0.075 | 2,841 | 2.7 | 2,441 | 6.7 | 4,640 | 0.32 | 0.12 |
| SO | 2.5 | Polym | 81.9 | 97.4 | 15.5 | 0.117 | | | 8,207 | 4.5 | 15,886 | 0.25 | 1.0 |
| | 5.0 | | 73.0 | 90.5 | 17.5 | 0.094 | | | 6,485 | 3.8 | 10,529 | 0.12 | 0.32 |
| | 10.0 | | 58.5 | 72.0 | 13.5 | 0.090 | | | 4,447 | 3.4 | 8,837 | 0.15 | 0.20 |
| | 20.0 | | (³) | (³) | (³) | (³) | (³) | (³) | (³) | (³) | (³) | (³) | (³) |
| SODEF | 2.5 | Mech | 83.1 | 100.8 | 17.3 | 0.088 | | | 7,833 | 3.2 | 14,688 | 0.24 | 0.74 |
| | 10.0 | | 68.8 | 88.8 | 17.4 | 0.076 | | | 8,138 | 3.8 | 15,100 | 0.22 | 0.48 |
| | 20.0 | | | | | 0.062 | | | 6,253 | 3.2 | 12,500 | 0.23 | 0.40 |
| SODEF | 2.5 | Polym | 68.8 | 87.5 | 18.7 | 0.068 | | | 7,715 | 5.0 | 13,290 | 0.19 | 0.92 |
| | 10.0 | | 60.4 | 79.2 | 18.8 | 0.091 | | | 7,272 | 10.5 | 12,540 | 0.25 | 0.75 |
| | 20.0 | | 52.3 | 72.0 | 19.7 | 0.067 | | | 5,912 | 7.5 | 10,960 | 0.26 | 0.54 |
| SODBF | 2.5 | Polym | 73.1 | 89.6 | 16.5 | 0.096 | | | 8,014 | 7.0 | 15,860 | 0.18 | 1.2 |
| | 10.0 | | 57.5 | 84.6 | 27.1 | 0.095 | 5,697 | 7.5 | 4,890 | 10.0 | 10,715 | 0.20 | 0.69 |
| | 20.0 | | 37.5 | 58.8 | 20.7 | 0.072 | 3,420 | 7.5 | 3,750 | 16.0 | 6,400 | 0.45 | 0.37 |

¹ Specific viscosity: Determined on 0.1 percent solution of blend in xylene at 25° C.
² Commercial mass-polymerized polystyrene.
³ Would not polymerize.
SO=Soybean oil.
SODEF=Soybean oil-diethyl fumarate adduct.
SODBF=Soybean oil-bibutyl fumarate adduct.

from the group consisting of dialkyl fumarates, dialkoxyalkyl fumarates, and alkyl alkoxyalkyl fumarates.

2. Styrene polymer according to claim 1, wherein said fumarate is diethyl fumarate.

3. Styrene polymer according to claim 1, wherein said fumarate is dibutyl fumarate.

4. Styrene polymer according to claim 1, wherein a minor amount of an ethylenically unsaturated comonomer is interpolymerized with said styrene containing said adduct.

5. Styrene polymer prepared by polymerizing styrene containing a small quantity, sufficient to improve at least one of the following properties of the styrene polymer: transition range, tensile elongation, flexural deflection and impact strength, of an adduct in which one mole of an unsaturated non-hydroxylated fatty oil having from 10 to 24 carbon atoms in each acid portion thereof is combined with from 3 to 12 moles of a dialkyl fumarate of from 6 to 20 carbon atoms.

6. Styrene polymer prepared by mass polymerizing styrene containing from 2 to 10 weight percent, based on the total weight of said styrene plus adduct, of an adduct in which one mole of an unsaturated, non-hydroxylated fatty oil having from 10 to 24 carbon atoms in each acid portion thereof, is combined with from 5 to 10 moles of dibutyl fumarate.

7. Styrene polymer according to claim 6 wherein said fatty oil is soybean oil.

8. A water base emulsion for surface coating comprising an aqueous latex of a styrene polymer prepared by the emulsion polymerization of styrene containing a small quantity of an adduct of an unsaturated non-hydroxylated fatty oil and a fumarate selected from the group consisting of dialkyl fumarates, dialkoxyalkyl fumarates, and alkyl alkoxyalkyl fumarates.

9. A process which comprises subjecting an initial reaction mixture comprising styrene having dissolved therein from one to 30 weight percent of an adduct hereinafter described, to mass polymerization conditions resulting in a styrene polymer of at least 100,000 molecular weight, an alcohol solubles content of less than 5 weight percent, and higher value of at least one of the properties: transition range, tensile elongation, flexural deflection, and impact strength than styrene polymer made at the same conditions without said adduct, said adduct being an adduct in which one mole of an unsaturated non-hydroxylated fatty oil having from 10 to 24 carbon atoms in each acid portion thereof is combined with at least three moles of a dialkyl fumarate of from 6 to 20 carbon atoms.

10. A process which comprises polymerizing styrene having intimately dispersed therein a small quantity of an adduct of an unsaturated nonhydroxylated fatty oil and a fumarate selected from the group consisting of dialkyl fumarates, dialkoxyalkyl fumarates, and alkyl alkoxyalkyl fumarates.

11. A process which comprises polymerizing styrene having intimately dispersed therein a small quantity of a diethyl fumarate-soybean oil adduct.

12. A process which comprises polymerizing styrene having intimately dispersed therein a small quantity of a dibutyl fumarate-soybean oil adduct.

13. A process which comprises polymerizing styrene having intimately dispersed therein a small quantity of an adduct in which one mole of an unsaturated non-hydroxylated fatty oil having from 10 to 24 carbon atoms in each acid portion thereof is combined with from 5 to 10 moles of a dialkyl fumarate of from 6 to 20 carbon atoms.

14. High molecular weight resinous styrene polymer prepared by polymerizing, at conditions resulting in polymer having a molecular weight of at least 100,000 and an alcohol solubles content of less than 5 weight percent, a monomeric material consisting essentially of styrene and containing from 1 to 10 weight percent, based on the total weight of said monomeric material plus adduct, of an adduct in which one mole of an unsaturated non-hydroxylated fatty triglyceride oil having from 10 to 24 carbon atoms in each acid portion thereof is combined with from 5 to 10 moles of a dialkyl fumarate wherein each alkyl group contains not more than 8 carbon atoms.

15. High molecular weight resinous styrene polymer prepared by polymerizing, at conditions resulting in polymer having a molecular weight of at least 100,000 and an alcohol solubles content of less than 5 weight percent, a monomeric material consisting essentially of styrene and containing from 2 to 10 weight percent, based on the total weight of said monomeric material plus adduct, of an adduct in which one mole of an unsaturated non-hydroxylated fatty triglyceride oil having from 10 to 24 carbon atoms in each acid portion thereof is combined with from 5 to 10 moles of a dialkoxyalkyl fumarate wherein each alkoxyalkyl group contains not more than 8 carbon atoms.

16. High molecular weight resinous styrene polymer prepared by polymerizing, at conditions resulting in polymer having a molecular weight of at least 100,000 and an alcohol solubles content of less than 5 weight percent, a monomeric material consisting essentially of styrene and containing from 2 to 10 weight percent, based on the total weight of said monomeric material plus adduct, of an adduct in which one mole of an unsaturated non-hydroxylated fatty triglyceride oil having from 10 to 24 carbon atoms in each acid portion thereof is combined with from 5 to 10 moles of an alkyl alkoxyalkyl fumarate wherein the alkyl and the alkoxyalkyl group each contains not more than 8 carbon atoms.

References Cited in the file of this patent

UNITED STATES PATENTS 2,678,934    Grummitt    May 18, 1954

U. S. DEPARTMENT OF COMMERCE
PATENT OFFICE

CERTIFICATE OF CORRECTION

Patent No. 2,824,846      Ival O. Salyer et al.      February 25, 1958

It is hereby certified that error appears in the printed specification of the above numbered patent requiring correction and that the said Letters Patent should read as corrected below.

Column 1, line 40, for "valve" read -- value --; column 3, line 26, for "usual" read -- useful --; columns 7 and 8, last line of footnotes under Table 1, for "oil-bibutyl" read -- oil-dibutyl --; column 10, line 16, for "1 to 10" read -- 2 to 10 --.

Signed and sealed this 10th day of June 1958.

(SEAL)
Attest:

KARL H. AXLINE
Attesting Officer

ROBERT C. WATSON
Commissioner of Patents